(12) United States Patent
Jones et al.

(10) Patent No.: US 10,218,749 B2
(45) Date of Patent: Feb. 26, 2019

(54) SYSTEMS, METHODS, AND COMPUTER PROGRAMS FOR ESTABLISHING A SCREEN SHARE SESSION FOR A REMOTE VOICE CALL

(71) Applicant: American Teleconferencing Services, Ltd., Atlanta, GA (US)

(72) Inventors: Boland Timothy Jones, Atlanta, GA (US); David Michael Guthrie, Atlanta, GA (US); Michael Coon, Pike Road, AL (US); John Robert Perkins, West Point, GA (US)

(73) Assignee: American Teleconferencing Services, Ltd., Atlanta, GA (US)

( * ) Notice: Subject to any disclaimer, the term of this patent is extended or adjusted under 35 U.S.C. 154(b) by 96 days.

(21) Appl. No.: 15/343,243

(22) Filed: Nov. 4, 2016

(65) Prior Publication Data

US 2018/0131731 A1 May 10, 2018

(51) Int. Cl.
*H04L 29/06* (2006.01)
*G06F 3/14* (2006.01)
*G06F 3/0486* (2013.01)
*G06F 3/0482* (2013.01)
(Continued)

(52) U.S. Cl.
CPC ........ *H04L 65/1089* (2013.01); *G06F 3/0482* (2013.01); *G06F 3/0486* (2013.01); *G06F 3/0488* (2013.01); *G06F 3/1454* (2013.01); *H04L 65/1059* (2013.01); *H04L 65/1069* (2013.01); *H04L 65/403* (2013.01); *H04L 65/4015* (2013.01); *H04M 1/72522* (2013.01); *H04M 1/72583* (2013.01); *H04M 2250/22* (2013.01); *H04M 2250/62* (2013.01)

(58) Field of Classification Search
CPC .................................................. H04L 65/1093
See application file for complete search history.

(56) References Cited

U.S. PATENT DOCUMENTS 7,290,061 B2 * 10/2007 Lentini ............... G06F 17/3089
709/227
8,150,014 B2 * 4/2012 Wengrovitz ...... H04M 3/42323
370/352

(Continued)

*Primary Examiner* — Jimmy H Tran
(74) *Attorney, Agent, or Firm* — Smith Tempel Blaha LLC

(57) ABSTRACT

Systems, methods, and computer systems are disclosed for establishing a screen share session. One such method comprises a collaboration server receiving a message from an application executing on a mobile communication device. The message identifies that a voice call remote to the collaboration server has been initiated by the mobile communication device and established between a calling party using the mobile communication device and one or more called parties. The collaboration server determines that the calling party and the one or more called parties in the remote voice call have an active collaboration presence with the collaboration server. The collaboration server initiates a display of a screen share user interface control on a first computing device associated with the calling party and one or more second computing devices associated with the one or more called parties. The screen share user interface control is configured to enable the calling party and the one or more called parties to establish a screen share session.

20 Claims, 17 Drawing Sheets

(51) Int. Cl.
*G06F 3/0488* (2013.01)
*H04M 1/725* (2006.01)

(56) References Cited

U.S. PATENT DOCUMENTS

| | | | | |
|---|---|---|---|---|
| 8,555,176 B2* | 10/2013 | Elumalai | | G06Q 10/10 |
| | | | | 715/751 |
| 8,583,619 B2* | 11/2013 | Ghods | | G06F 9/541 |
| | | | | 707/706 |
| 8,631,065 B2* | 1/2014 | Dargahi | | G06Q 10/00 |
| | | | | 709/203 |
| 8,855,281 B2* | 10/2014 | Kho | | H04L 65/403 |
| | | | | 379/142.04 |
| 8,929,526 B2* | 1/2015 | Kho | | H04L 65/403 |
| | | | | 379/142.04 |
| 9,015,239 B2* | 4/2015 | Banatwala | | G06Q 10/10 |
| | | | | 709/203 |
| 9,065,665 B1* | 6/2015 | Fritz | | H04L 12/1818 |
| 9,519,526 B2* | 12/2016 | Ghods | | G06F 9/541 |
| 9,742,849 B2* | 8/2017 | Trott | | H04L 65/4038 |
| 9,853,824 B2* | 12/2017 | Zimmet | | G06Q 10/103 |
| 2002/0091835 A1* | 7/2002 | Lentini | | G06F 17/3089 |
| | | | | 709/227 |
| 2005/0138118 A1* | 6/2005 | Banatwala | | G06Q 10/10 |
| | | | | 709/204 |
| 2007/0263830 A1* | 11/2007 | Wengrovitz | | H04M 3/42323 |
| | | | | 379/219 |
| 2008/0004056 A1* | 1/2008 | Suzman | | G06Q 10/10 |
| | | | | 455/466 |
| 2008/0147810 A1* | 6/2008 | Kumar | | G06Q 10/107 |
| | | | | 709/206 |
| 2011/0239134 A1* | 9/2011 | Spataro | | G06F 17/30011 |
| | | | | 715/753 |
| 2011/0270922 A1* | 11/2011 | Jones | | G06F 3/0486 |
| | | | | 709/204 |
| 2011/0271192 A1* | 11/2011 | Jones | | G06F 3/0421 |
| | | | | 715/727 |
| 2011/0271197 A1* | 11/2011 | Jones | | G06Q 10/101 |
| | | | | 715/739 |
| 2011/0289224 A1* | 11/2011 | Trott | | H04L 65/4038 |
| | | | | 709/227 |
| 2012/0269185 A1* | 10/2012 | Castleman | | H04M 7/0027 |
| | | | | 370/352 |
| 2013/0060849 A1* | 3/2013 | Zimmet | | G06Q 10/103 |
| | | | | 709/204 |
| 2013/0332536 A1* | 12/2013 | Kho | | H04L 65/403 |
| | | | | 709/205 |
| 2016/0029269 A1* | 1/2016 | Tamura | | H04W 36/0022 |
| | | | | 455/436 |

* cited by examiner

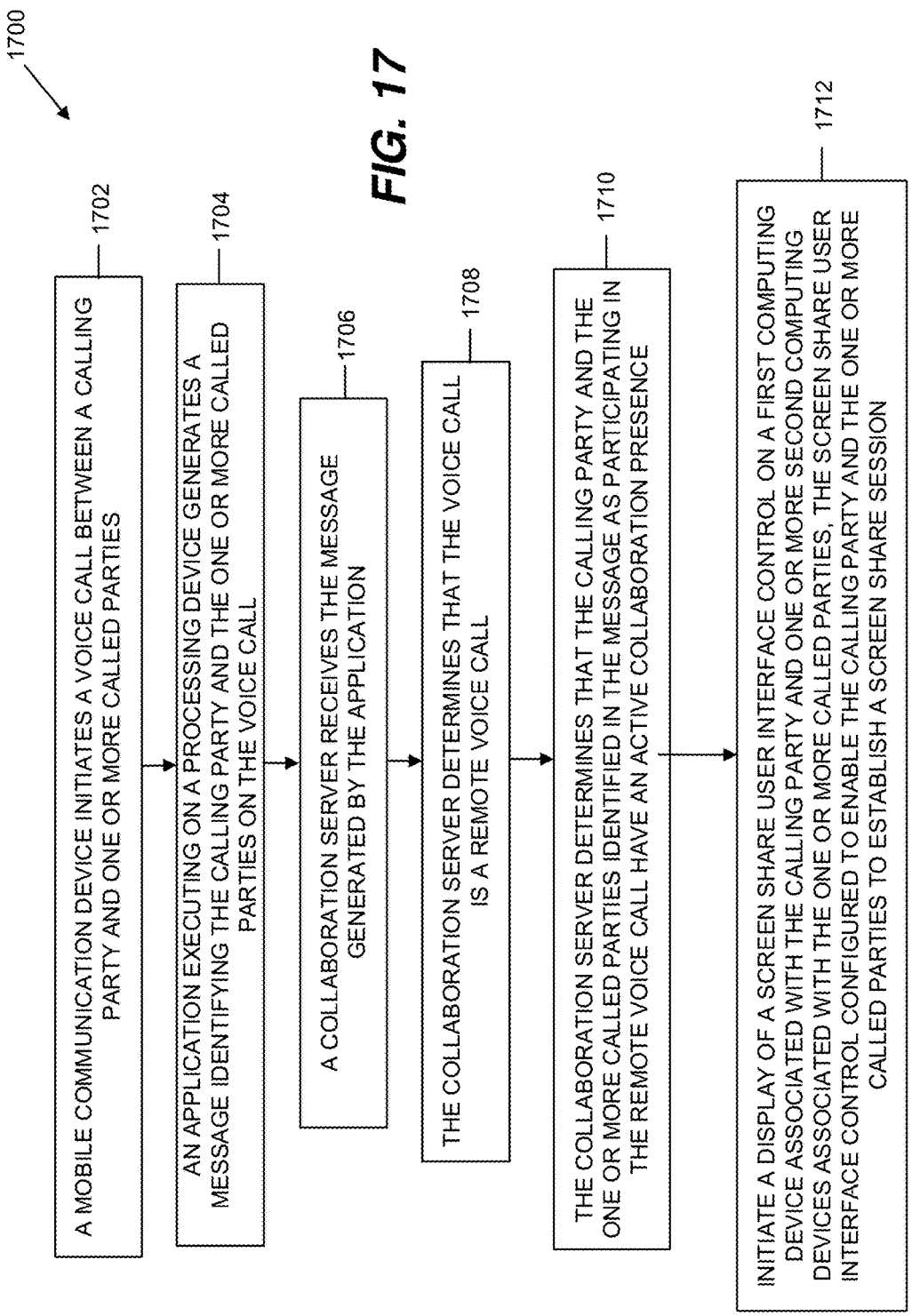

SYSTEMS, METHODS, AND COMPUTER PROGRAMS FOR ESTABLISHING A SCREEN SHARE SESSION FOR A REMOTE VOICE CALL

BACKGROUND

Currently, there are a number of conference solutions for enabling people to conduct live meetings, audio conferences, video conferences, conferences, presentations, or other types of gatherings via the Internet, the public switched telephone network (PSTN), or other voice and/or data networks. Participants typically use a telephone, computer, or other communication device that connects to an integrated conference system. The meetings typically include an audio component with an accompanying visual online component. Existing conferencing solutions employ an integrated solution in which the audio and online components are integrated via a comprehensive conferencing system. The audio component is provided via a conference bridge. Participants access the conference bridge using a dial-in phone number and passcodes. An accompanying online component may be accessed via a web service that provides various types of media and collaboration functionality, including, for example, a shared presentation window, a whiteboard application, a screen share application, real-time messaging, and document/media sharing and editing.

While these types of integrated conference solutions have become an indispensable form of communication for many businesses and individuals, they require sophisticated system capabilities for integrating the audio conference bridge with the accompanying online collaboration. With many individuals, organizations, and enterprises having a preference for one of the various available conferencing solutions, it can be problematic to manage and schedule conferences in an increasingly complicated landscape. This problem is further complicated with the various available software applications for managing calendars, events, contacts, conferences, customer relationships, etc. For example, it is not unusual for an individual user to manage personal contacts, corporate contacts, social network contacts, and customer contacts with different software applications, websites, or application service providers, while being forced to organize phone calls, conference calls, online conferences, and in-person meetings with these contacts across multiple conferencing tools.

Furthermore, existing integrated conference solutions are limited by a restrictive user experience, which requires that participants know in advance that both the audio and online components will be used for the meeting and which conferencing service provider will be used. A host must select the conferencing service provider, schedule the meeting, and distribute the access information. Participants dial-in to the conference bridge or request that the conference system dial-out to their telephone number. Then, the participants access the online component via a computing device.

In this regard, existing systems for providing online collaboration and conferencing functions are incapable of conveniently accommodating spontaneous, impromptu, or otherwise unscheduled phone calls. For example, consider the ubiquitous mobile phone call. A first person (i.e., the calling party) initiates an outgoing call to one or more other persons (i.e., called parties). The call may be established via the public switched telephone network (PSTN), a voice over Internet Protocol (VoIP) service provider, a peer-to-peer connection, or otherwise. During the voice call, the need may arise for online collaboration (e.g., a screen share session, document sharing and/or editing, browser sharing, messaging, etc.). In this context, the participants in the voice call will have to agree on the appropriate service provider, pause the discussion to access the online application, and then configure the online application with the appropriate connections, settings, etc. to initiate online collaboration among the call participants. If a conference service provider is being used, the parties may be required to terminate the voice call, and then pick-up the conversation after setting up a conference call and accessing the collaboration functionality.

Accordingly, despite the many advantages and commercial success of conferencing and collaboration solutions, there remains a need in the art for improved systems, methods, and computer programs for establishing online collaboration (e.g., screen sharing session) for unscheduled, impromptu, or spontaneous voice calls.

SUMMARY

Various embodiments of systems, methods, and computer programs are disclosed for establishing a screen share session. One such method comprises a collaboration server receiving a message from an application executing on a mobile communication device. The message identifies that a voice call remote to the collaboration server has been initiated by the mobile communication device and established between a calling party using the mobile communication device and one or more called parties. The collaboration server determines that the calling party and the one or more called parties in the remote voice call have an active collaboration presence with the collaboration server. The collaboration server initiates a display of a screen share user interface control on a first computing device associated with the calling party and one or more second computing devices associated with the one or more called parties. The screen share user interface control is configured to enable the calling party and the one or more called parties to establish a screen share session.

Another embodiment is computer program embodied in a computer-readable medium and executed by a processing device associated with a collaboration server for establishing a screen share session between two or more participants in a remote voice call. The computer program comprises logic configured to: receive a message from an application executing on a mobile communication device, the message identifying that a voice call remote to the collaboration server has been initiated by the mobile communication device and established between a calling party using the mobile communication device and one or more called parties; determine that the calling party and the one or more called parties in the remote voice call have an active collaboration presence with the collaboration server; and initiate a display of a screen share user interface control on a first computing device associated with the calling party and one or more second computing devices associated with the one or more called parties, the screen share user interface control configured to enable the calling party and the one or more called parties to establish a screen share session.

A further embodiment is a computer system for establishing a screen share session between participants in a remote voice call. The computer system comprises a mobile communication device configured to initiate a voice call between a calling party and one or more called parties, the mobile communication device comprising a mobile application executable by a processing device and comprising logic configured to generate a message identifying the calling party and the one or more called parties on the voice call. A collaboration server is in communication with the mobile application via a communication network. The collaboration server comprises an external voice call detection component, a collaboration presence component, and a screen share component. The external voice call detection component is configured to receive the message from the mobile application and determine that the voice call is a remote voice call. The collaboration presence component is configured to determine that the calling party and the one or more called parties identified in the message as participating in the remote voice call have an active collaboration presence with the collaboration server. The screen share component is in communication with the collaboration presence component, and is configured to initiate a display of a screen share user interface control on a first computing device associated with the calling party and one or more second computing devices associated with the one or more called parties. The screen share user interface control is configured to enable the calling party and the one or more called parties to establish a screen share session.

BRIEF DESCRIPTION OF THE DRAWINGS

FIG. 17 is a flow chart illustrating an embodiment of a method implemented in the system of FIG. 1 for establishing a screen share session for a remote voice call.

DETAILED DESCRIPTION

Figure 1:
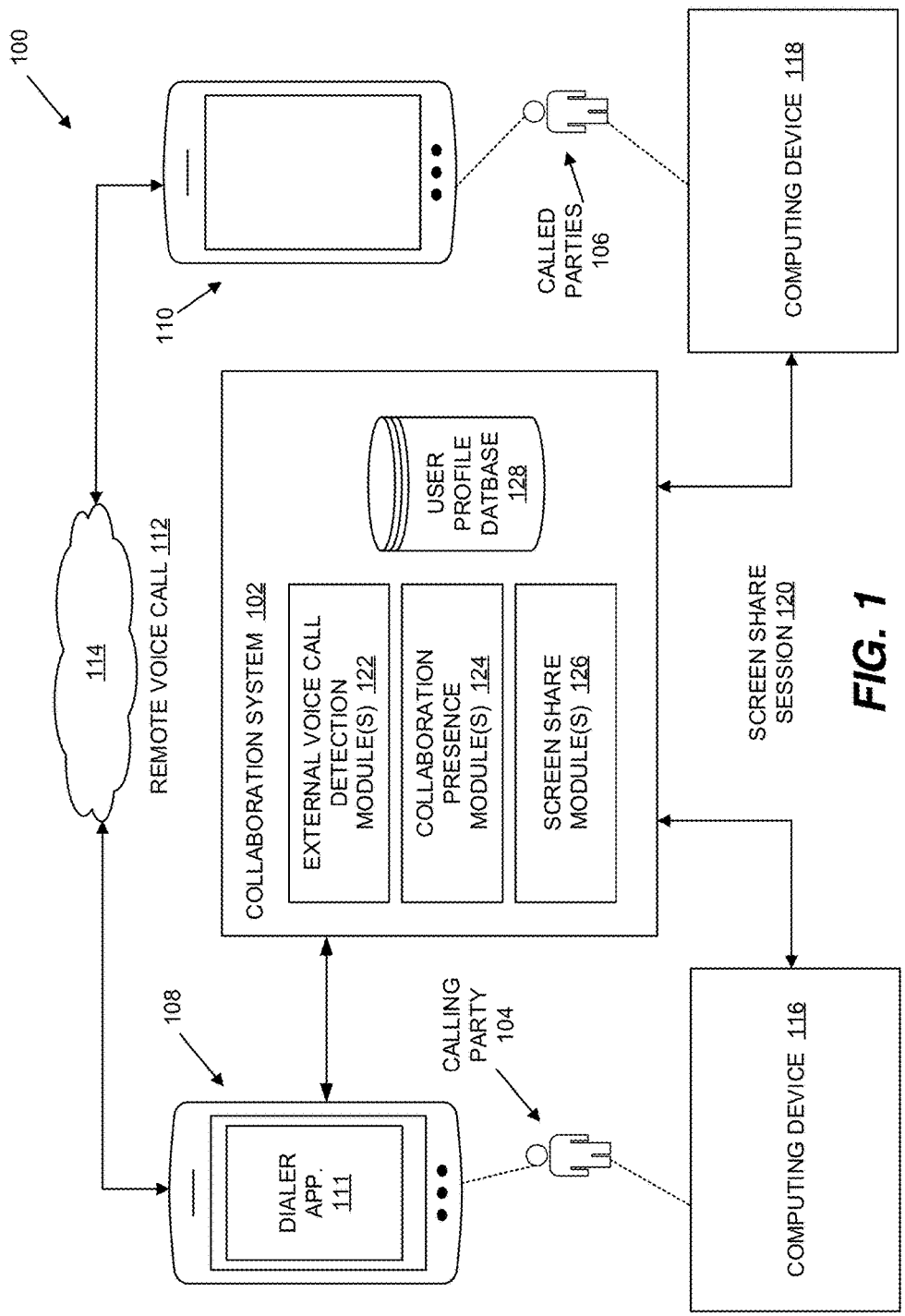
FIG. 1 is a block diagram illustrating an embodiment of a collaboration system for establishing a screen share session for a remote voice call.

FIG. 1 illustrates an embodiment of a computer system 100 comprising a collaboration system 102 configured to establish a screen share session 120 for a remote voice call 112. The remote voice call 112 comprises a voice call initiated by a calling party 104 via a mobile communication device 108 to one or more called parties 106. It should be appreciated that the term "remote voice call 112" refers to a voice call that is established by a remote or external service provider other than the collaboration system 102. In other words, the collaboration system 102 does not establish the remote voice call 112. As illustrated in FIG. 1, the calling party 104 initiates the remote voice call 112 from the mobile communication device 108 to communication devices 110 corresponding to the called parties 106. The remote voice call 112 is established via a communication network 114.

The communication network(s) 114 may support wired and/or wireless communication via any suitable protocols and devices, including, for example, the Internet, the Public Switched Telephone Network (PSTN), cellular or mobile network(s), local area network(s), wide area network(s), or any other suitable communication infrastructure. In this regard, the calling party's mobile communication device 108 may comprise a cellular telephone, a smart phone, a tablet computer, or any other mobile or portable communication device configured to communicate with and establish a voice call via the communication network 114. The called party communication device(s) 110 may comprise a mobile communication device, a landline telephone, a soft phone, a Voice over Internet Protocol (VoIP) phone, or any other mobile, tablet, desktop or other computing device for receiving the remote voice call 112 from the calling party 104.

As further illustrated in FIG. 1, the calling party mobile communication device 108 comprises a mobile application configured to determine when the remote voice call 112 has been initiated or established via the remote/external service provider and notify the collaboration system 102 of the participants (i.e., the calling party 104 and the one or more called parties 106). In an embodiment, the mobile application may comprise a native dialer application 111 associated with an operating system (O/S) running on the mobile communication device 108. In other embodiments, the mobile application may comprise a third party application configured with or without a dialing functionality for initiating the remote voice call 112. The mobile application may support various features for managing business and/or personal contacts, calendars, meetings, etc.

Regardless of the manner in which the remote voice call 112 is initiated by the calling party 104 and established via the remote/external service provider, a mobile application or other software executing on the calling party's mobile communication device 108 (i.e., calling party software) may notify the collaboration system 102 of the remote voice call 112. In response to detecting the remote voice call 112, the calling party software may generate and send a message to the collaboration system 102. In an embodiment, the message may comprise participant information identifying the calling party 104 and the one or more called parties 106 in the remote voice call 112. The participant information may comprise a telephone number, a participant name, or a user or subscriber identifier associated with the collaboration system 102.

As illustrated in FIG. 1, the collaboration system 102 may comprise a database 128 for managing users that have registered for service(s) provided by the collaboration system 102. The database 128 may comprise user profiles for the calling party 104 and one or more of the called parties 106. The collaboration system 102 further comprises various modules associated with establishing the screen share session 120 for the remote voice call 112. In response to receiving the message from the calling party software, an external voice call detection module 122 may determine the existence of the remote voice call 112 established by the remote/external service provider. A collaboration presence module 124 may perform a look-up to the user profile database 128 to determine whether the calling party 104 and one or more of the called parties 106 participating in the remote voice call 112 have registered an active collaboration presence with the collaboration system 102.

For example, the calling party 104 and one or more of the called parties 106 may be simultaneously operating a computing device during the remote voice call 112, which has registered an active status or connection with the collaboration system 102. The calling party 104 may be operating a computing device 116 in communication with the collaboration system 102, which has registered an active collaboration presence active. One or more of the called parties 106 may be operating a corresponding computing device 118, which has registered an active collaboration presence with the collaboration system 102. For each user in the user profile database 128, the collaboration system 102 may keep track of whether the corresponding user is available for collaboration with other collaborators. In this manner, each user profile may define a list of potential collaborators. The collaboration presence module 124 may be configured to determine that one or more of the called parties 106 are potential collaborators of the calling party 104 and that they are available for online collaboration. If one or more of the called parties 106 have an active collaboration presence with the collaboration system 102 during the remote voice call 112, the screen share module 126 may initiate a display of a screen share user interface control on the corresponding computing devices 116 and 118. As described below in more detail, the screen share user interface control enables the participants in the remote voice call 112 to conveniently establish a screen share session 120 with one or more of the other participants.

Figure 2:
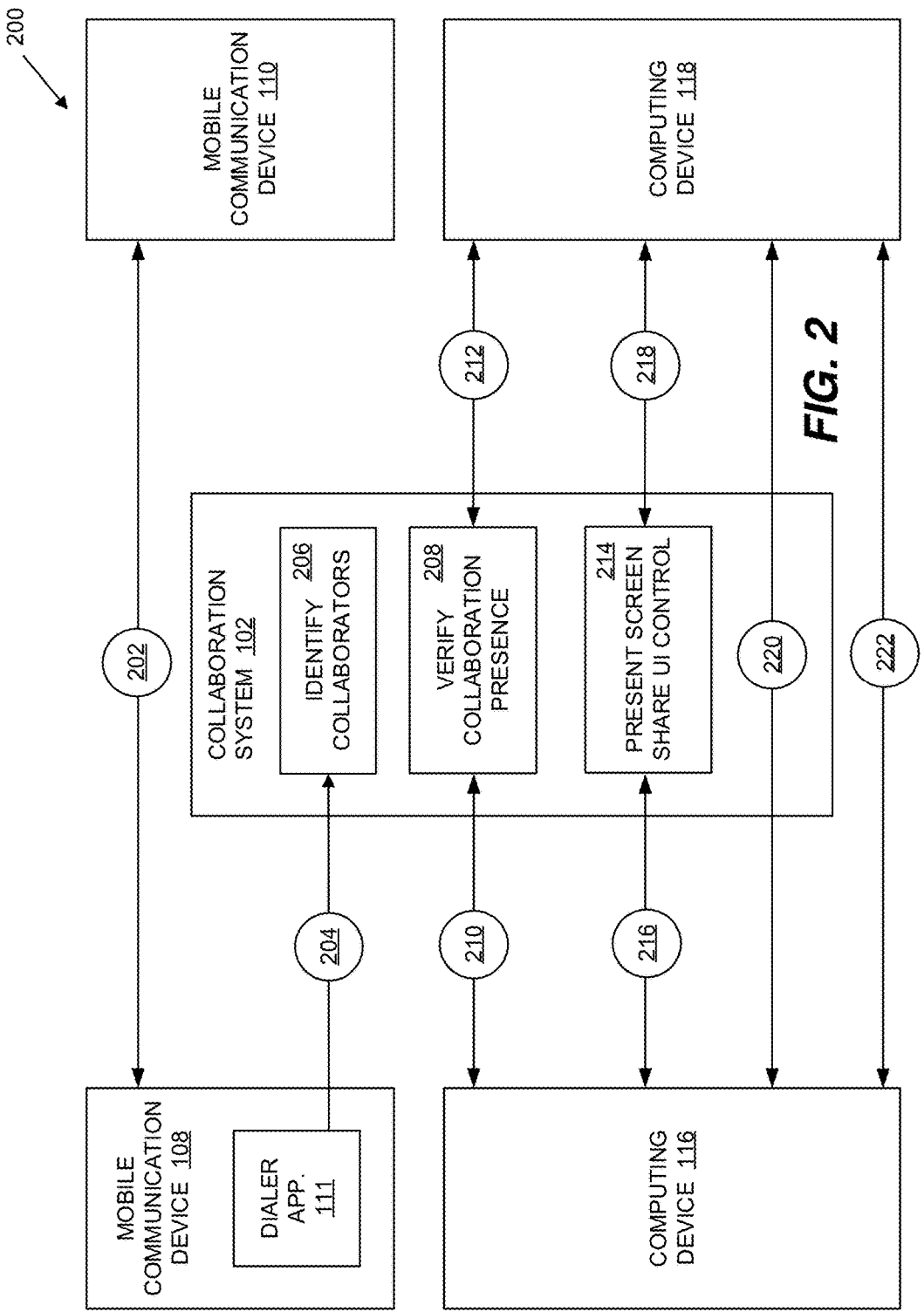
FIG. 2 illustrates an embodiment of a method implemented in the system of FIG. 1 for establishing a screen share session for a remote voice call.

FIG. 2 illustrates an embodiment of a method 200 implemented in the computer system 100 for establishing a screen share session 120 for a remote voice call 112. At reference numeral 202, a remote voice call 112 may be established between the calling party 104 and one or more called parties 106. As described above, the remote voice call 112 is initiated at the mobile communication device 108 operated by the calling party 104 and established via communication network(s) 114. In an embodiment, the calling party 104 initiates the remote voice call 112 via the native O/S dialer application 111 on the mobile communication device 108.

Figure 3:
FIG. 3 is a user interface screen shot of a dialer application for initiating the remote voice call via the mobile communication device.

FIG. 3 illustrates a user interface screen shot of a dialer screen 300 for an exemplary dialer application 111. The dialer screen 300 has a portion 302 comprising buttons 304 for inputting an outgoing telephone number. The outgoing telephone number may be displayed as the user selects the buttons 304 (reference numeral 306). A "dial" button 308 may be used to enter and initiate the remote voice call 112 to a called party 106. The dialer application 111 may support additional screens for adding one or more additional called parties 106 to the remote voice call 112. The dialer application 111 may be configured to notify the collaboration system 102 of the remote voice call 112. The dialer application 111 may generate a message comprising the participant information and send the message to the collaboration system 102. In other embodiments, the dialer application 111 may be configured to instruct another application or other software to generate the message and/or send the message to the collaboration system 102.

Referring again to FIG. 2, at reference numeral 204, the collaboration system 102 may receive the message from the dialing application 111 or other calling party software executing on the mobile communication device 108. At block 206, the collaboration system 102 may identify one or more of the called parties 106 as potential online collaborators. In an embodiment, the collaboration system 102 may use the participant information contained in the received message to perform a look-up to database 128 to determine whether the called parties 106 participating in the remote voice call 112 are potential online collaborators of the calling party 104. At block 208, the collaboration presence module 124 may determine the current collaboration presence for any called parties 106 that are potential online collaborators of the calling party 104. At reference numeral 210, the calling party 104 may have registered an active collaboration presence with the collaboration system 102 via computing device 116. At reference 212, one or more of the called parties 106 participating in the remote voice call 112 may have registered an active collaboration presence with the collaboration system 102 via computing device(s) 118. After determining that the calling party 104 and one or more of the called parties 106 in the remote voice call 112 are available for online collaboration, at block 214, the screen share module 126 may present a screen share user interface control to the calling party's computing device 116 (reference numeral 216) and the called party's computing device(s) 118 (reference numeral 218). As described below in more detail in connection with FIGS. 7-14, the screen share user interface control enables the participants in the remote voice call 112 to conveniently initiate the screen share session 120. It should be appreciated that the screen share session 120 may be established via the collaboration system 102 (reference numeral 220) or via a peer-to-peer connection between computing device 116 and computing device(s) 118 (reference numeral 222).

Figure 4:
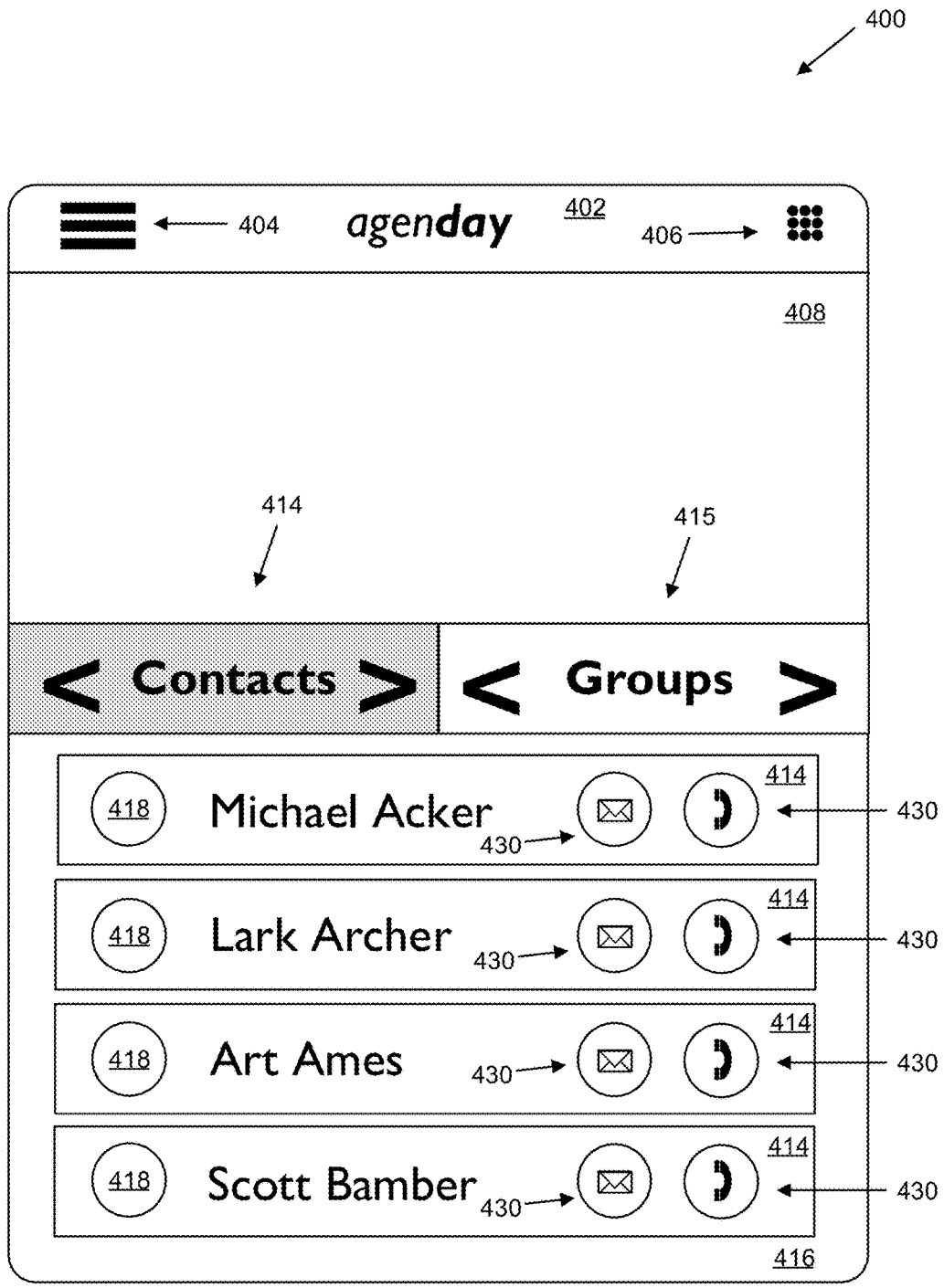
FIG. 4 is a user interface screen shot of an embodiment of a mobile application for initiating the remote voice call to a contact and generating a corresponding message for the collaboration system.

Referring to FIG. 4, in another embodiment, the calling party 104 may initiate the remote voice call 112 via a calendar/collaboration application associated with the collaboration system 102. FIG. 4 illustrates an exemplary embodiment of a contacts/groups view 400 displayed on the calling party's mobile communication device 108. The contacts/groups view 400 comprises a header bar 402, which includes a menu button 404 and a calendar button 406. When selected by a user, the menu button 404 may present various additional user selections for performing one or more of the following functions: schedule an event; enter a meeting; search for meetings; or configure application settings. The calendar button 406 exposes a calendar tool for enabling the user to switch the view to a particular date. An upper display portion 408 may display various types of content and/or functionality associated with the calling party's user profile (database 128). A lower display portion 416 is configured to display the calling party's individual contacts or group contacts. When a "contacts" tab 414 is selected, a list of individual contacts may be displayed. When a "groups" tab 415 is selected, a list of group contacts may be displayed.

FIG. 4 illustrates the "contacts" tab 414 selected to display four contacts in respective contact display sections 414. Each contact display section 414 may be configured to display, for example, an image 418 of the contact, a contact name, a button 430 to compose a message to the contact, and a button 430 to initiate a voice call to the contact. In response to the selection of a button 430, the calendar/collaboration application may be configured to notify the collaboration system 102 that a remote voice call 112 has been initiated to one of the calling party's contacts. The selection of a button 430 may automatically generate a message to the collaboration system 102 identifying the called party user profile (database 128) because the calendar/collaboration application is associated with the collaboration system 102. In this embodiment, the collaboration system 102 may deem the receipt of the message from the calendar/collaboration application as indication that a remote voice call 112 has been established with a potential online collaborator. In response to receiving the message, the collaboration presence module 124 may automatically check the presence status associated with the called party user profile(s). If the called party user profile(s) has an active collaboration presence, the screen share module 126 may automatically initiate display of the screen share user interface control.

Figure 5:
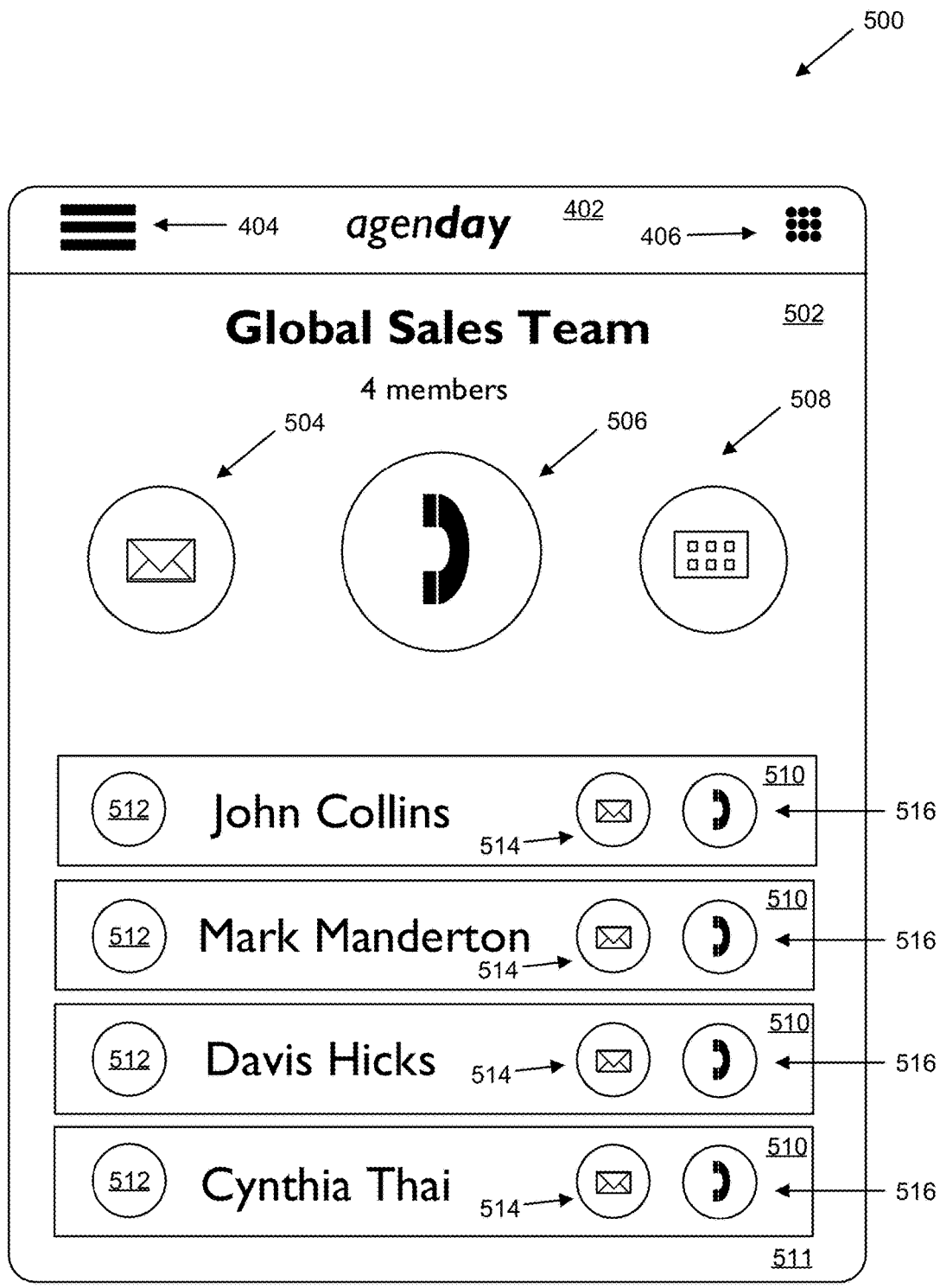
FIG. 5 is a user interface screen shot of another embodiment of a mobile application for initiating a group call and generating a corresponding message for the collaboration system.
Figure 6:
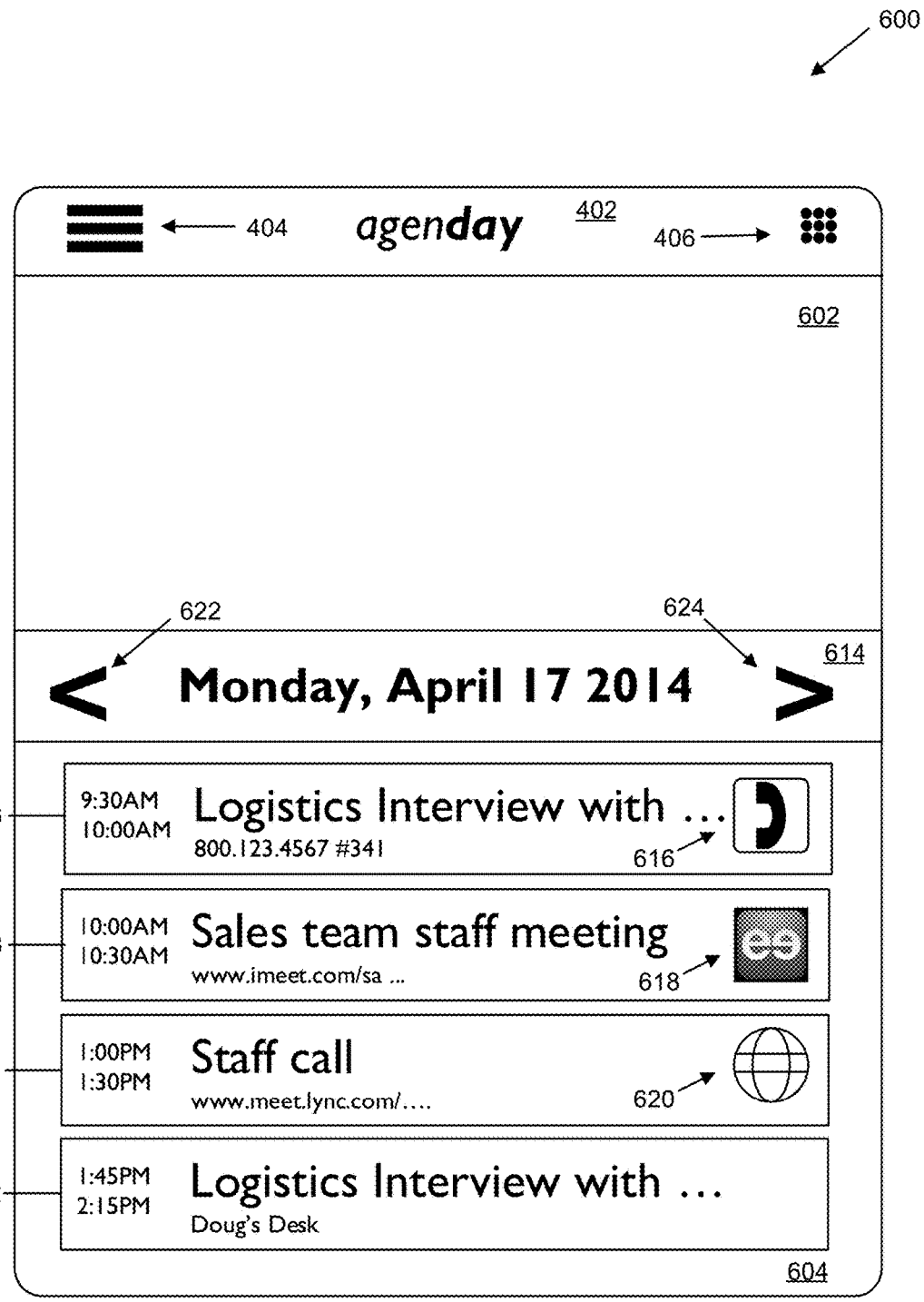
FIG. 6 is a user interface screen shot of another embodiment of a mobile application for initiating the remote voice call from a scheduled meeting and generating a corresponding message for the collaboration system.

FIG. 5 illustrates another embodiment in which the calling party 104 uses the calendar/collaboration application to initiate a group call. In response to selection of the groups tab 415 (FIG. 4), the calendar/collaboration application may enable the calling party to navigate and select one of a plurality of preconfigured groups. FIG. 5 illustrates an exemplary group call screen 500 for a selected group. An upper display portion 502 displays the title of the selected group ("Global Sales Team"), the number of members in the group, and various quick action icons. A message icon 504 may be selected to compose a message for each of the group members. A meeting icon 508 may be selected to schedule an in-person meeting, teleconference, online conference, etc. involving the group members. A call icon 506 may be selected to initiate a remote voice call 112 with the group members listed in a lower display portion 511. In the example of FIG. 5, the "Global Sales Team" group comprises four members with respective contact display sections 510. Each contact display section 510 may be configured to display, for example, an image 512 of the contact, a contact name, a button 514 to compose a message to the individual contact, and a button 516 to initiate a voice call to the individual contact. In response to the selection of the group call button 506 or the individual call button 516, the calendar/collaboration application may be configured to notify the collaboration system 102 that a remote voice call 112 has been initiated to one or more of the calling party's contacts. The selection of a button 506/516 from the group call screen 500 may automatically generate a message to the collaboration system 102 identifying the called party user profile(s) (database 128) because the calendar/collaboration application is associated with the collaboration system 102. In this embodiment, the collaboration system 102 may deem the receipt of the message from the calendar/collaboration application as indication that a remote voice call 112 has been established with potential online collaborator(s). In response to receiving the message, the collaboration presence module 124 may automatically check the presence status associated with the called party user profile(s). If the called party user profile(s) has an active collaboration presence, the screen share module 126 may automatically initiate display of the screen share user interface control FIG. 6 illustrates a further embodiment in which the calling party 104 uses the calendar/collaboration application to initiate a remote voice call from a calendar screen 600. An upper display portion 602 may display various content and/or functionality associated with the calling party's user profile. A lower display portion 604 displays four events 606, 608, 610, and 612 for the date identified in a navigation bar 614. The navigation bar 614 comprises buttons 622 and 624 for searching forward and backward, respectively, in the calling party's calendar. Each event may display information, such as, the time, an event description, an event type, and if applicable a button for initiating the event directly from the calendar/collaboration application. Event 606 comprises a teleconference, and the corresponding button 616 may be selected to automatically initiate the teleconference based on a dial-in number and passcode. Event 608 comprises an online conference hosted by the collaboration system 102, and the corresponding button 618 may be selected to automatically initiate the online conference located at a particular URL. Event 610 comprises an online meeting hosted by a remote conference system, and the corresponding button 620 may be selected to automatically initiate the meeting with the third party provider.

In response to the selection of one of the buttons 616, 618, and 620, the calendar/collaboration application may be configured to notify the collaboration system 102 of the corresponding event type. If the event type involves a remote voice call 112 external to the collaboration system 102 (e.g., a teleconference or online meeting hosted by a third party provider), the collaboration system 102 may identify the called party user profile(s) (database 128) because the calendar/collaboration application is associated with the collaboration system 102. In this embodiment, the collaboration system 102 may deem the receipt of the message from the calendar/collaboration application with the remote event type as indication that a remote voice call 112 has been established with potential online collaborator(s). In response to receiving the message, the collaboration presence module 124 may automatically check the presence status associated with the called party user profile(s). If the called party user profile(s) has an active collaboration presence, the screen share module 126 may automatically initiate display of the screen share user interface control.

Figure 7:
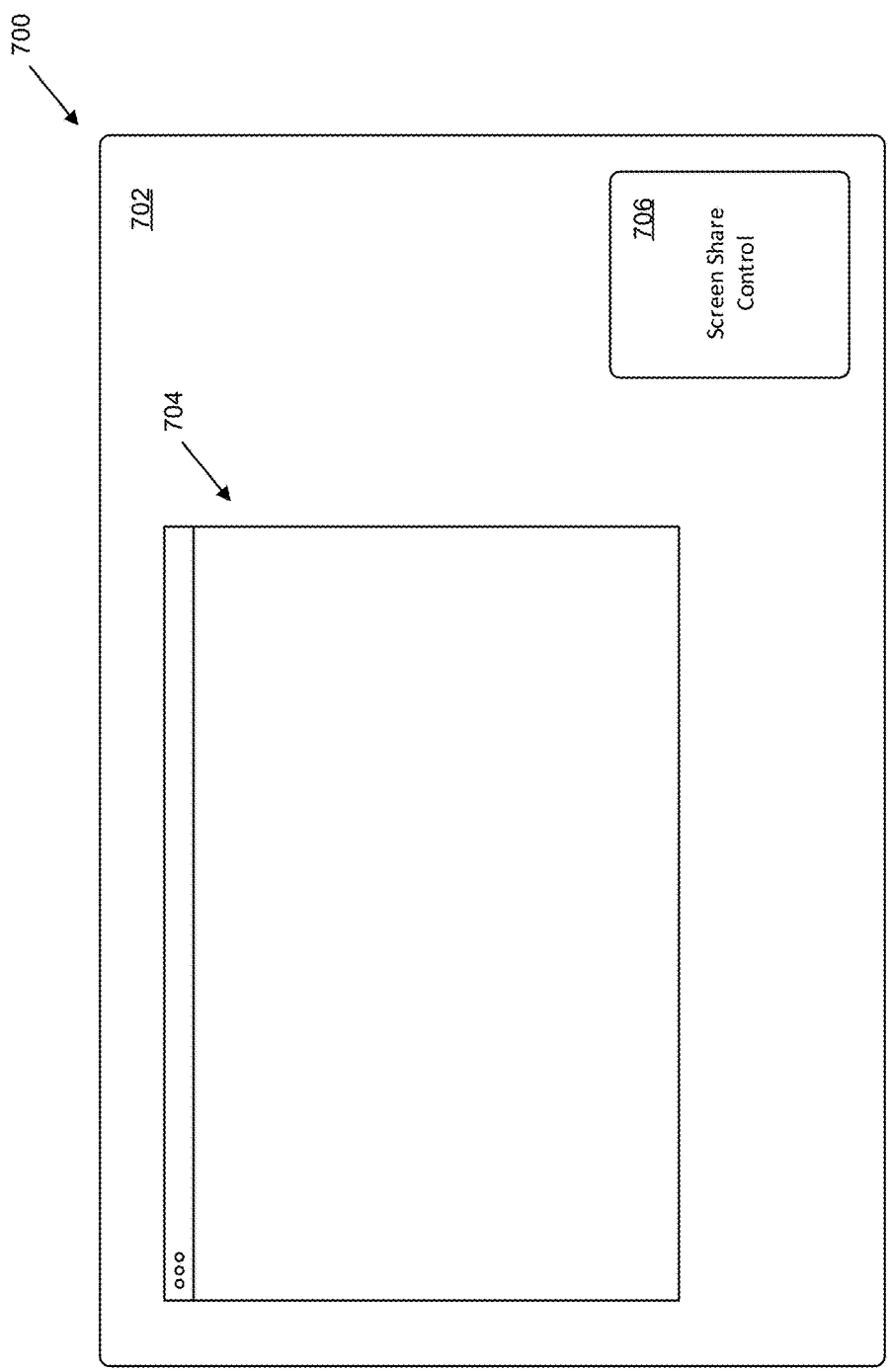
FIG. 7 is a user interface screen shot of a computing device for displaying the screen share control generated by the collaboration system.

Having described various embodiments for initiating the remote voice call 112 and verifying that one or more called parties 106 have an active collaboration presence with the collaboration system 102, the establishment of the screen share session 120 will be described with reference to FIGS. 7-14. FIG. 7 illustrates an exemplary embodiment of a screen share user interface control displayed on the calling party's computing device 116. It should be appreciated that a similar screen share user interface control may be displayed on the computing device(s) 118 of the one or more called parties 106.

In the embodiment of FIG. 7, the screen share user interface control 706 comprises a dedicated portion of a display region of the computing device 116. The screen share user interface control 706 may be configured as a seamless graphical overlay via a graphical user interface. For example, as illustrated in FIG. 7, the screen share user interface control 706 may be persistently displayed over a desktop 702, application window(s) 704, or when an application window 704 is maximized to occupy the entire display region. It should be appreciated that the graphical overlay may be persistently displayed in any inconspicuous manner, manually hidden and activated when desired, and/or automatically hidden/activated based on predefined user interface actions. Furthermore, the user may customize the location of the screen share user interface control 706 by, for example, dragging and dropping the object to any desirable region of the display region.

Figure 8:
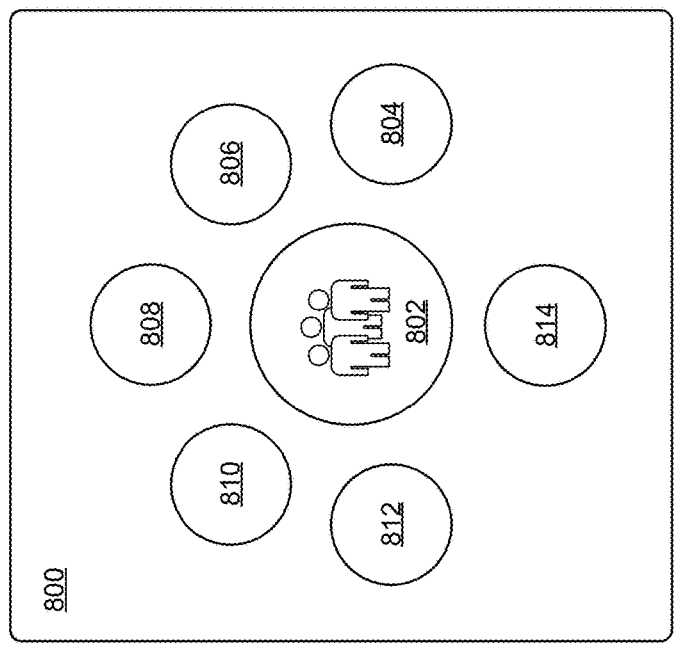
FIG. 8 illustrates an embodiment of a screen share control.

FIG. 8 illustrates an embodiment of a screen share user interface control 706 comprising a user interface component 800. In the embodiment of FIG. 8, component 800 displays one or more user interface objects identifying each of the participants on the remote voice call 112 that a calling party may collaborate with by, for example, initiating a screen share session. In the example of FIG. 8, the calling party is participating in a remote voice call 112 with six called parties who have been verified as having an active collaboration presence with the collaboration system 102. The called parties are identified with respective user interface objects 804, 806, 808, 810, 812, and 814, respectively. The user interface objects 804, 806, 808, 810, 812, and 814 may comprise an image, avatar, etc. for visually identifying the respective called party. The graphical representation may be customized by the called party 106 or the calling party 104. In an embodiment, the calling party may initiate a screen share session 120 with individual called parties by selecting the corresponding user interface object and performing a drag-and-drop user interface command to a display region of the computing device 116. Component 800 may further comprise a group user interface object 802 for initiating the screen share session 120, via a drag-and-drop user interface command, with all of the available collaborators in the remote voice call 112.

Figure 9:
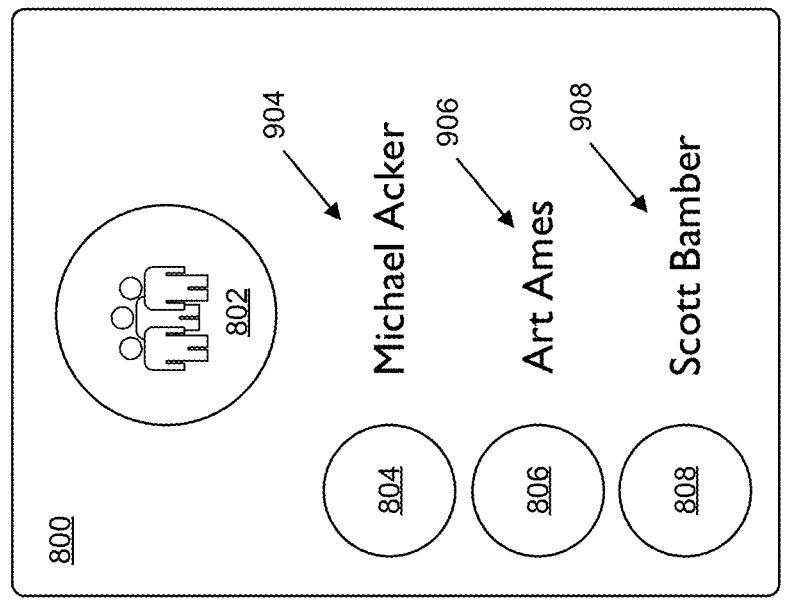
FIG. 9 illustrates another embodiment of a screen share control.

FIG. 9 illustrates an alternative embodiment of a screen share user interface control 706 displayed on the calling party's computing device 116. In this embodiment, the calling party 104 is participating in a remote voice call 112 with three called parties 106 who have been verified as having an active collaboration presence with the collaboration system 102. The component 800 displays the group user interface object 802 with objects 804, 806, and 808 arranged in a list with corresponding names 904, 906, and 908, respectively.

Figure 10:
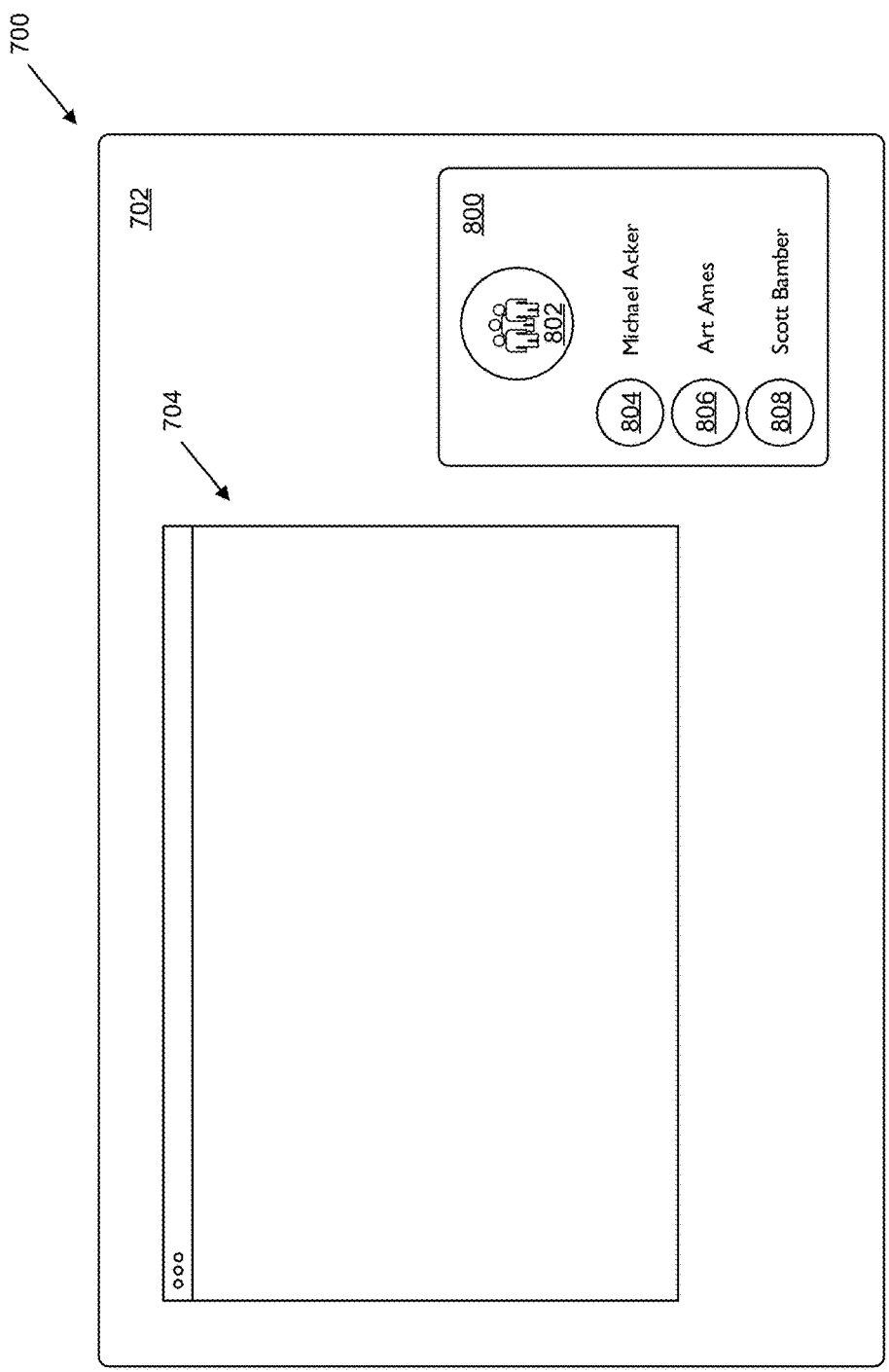
FIG. 10 illustrates the screen share control of FIG. 9 displayed on the computing device of FIG. 7.
Figure 11:
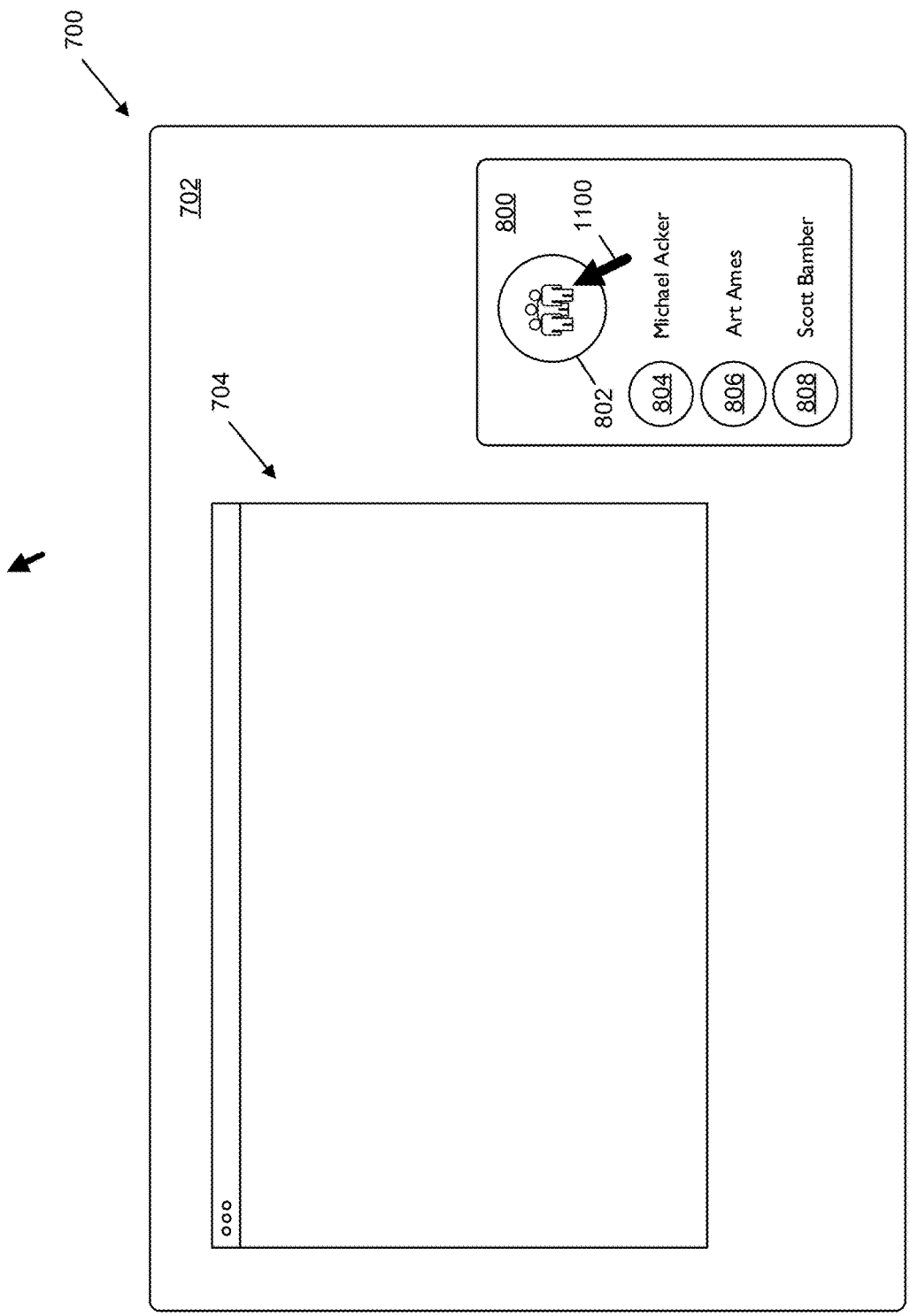
FIG. 11 illustrates the screen shot of FIG. 10 in which the calling party has selected the group share user interface object.
Figure 12:
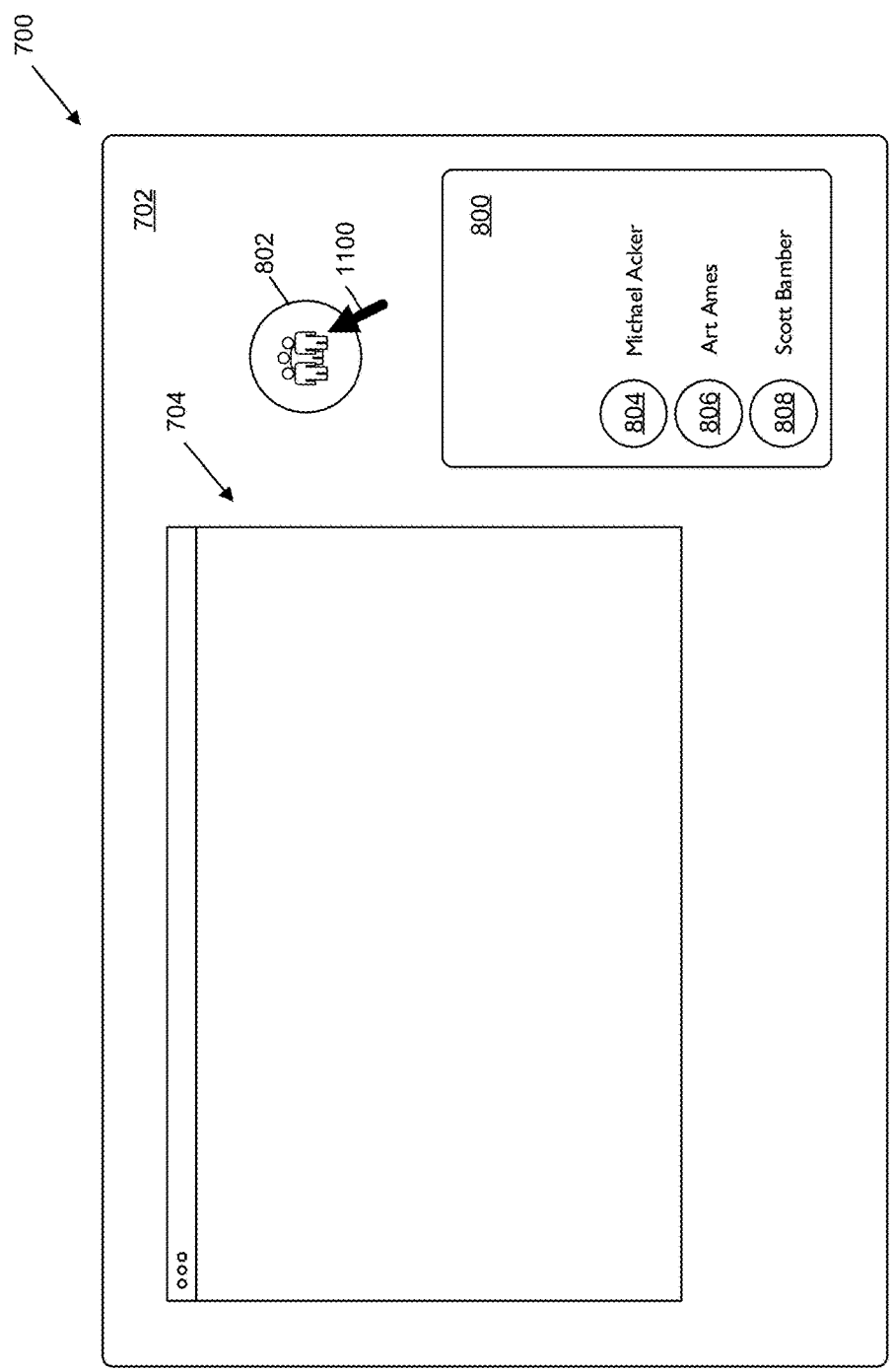
FIG. 12 illustrates the group share user interface object of FIG. 11 being dragged and dropped to a desktop region to initiate a group screen share session.

FIG. 10 illustrates the screen share user interface control 706 of FIG. 9 displayed on the calling party's computing device 116 during the remote voice call 112. FIGS. 11 and 12 illustrate an embodiment in which the calling party 104 initiates a group screen share session 120 of the entire display region of the computing device 116. As illustrated in FIG. 11, the group object 802 may be selected with a cursor 1100 or other input means (e.g., touch gesture, key stroke(s), audio command, etc.) and then dragged and dropped to a predetermined display region (e.g., desktop 702) as illustrated in FIG. 12. In response to a drag-and-drop operation of the group object 802 to the desktop 702, the computing device 116 may send a command to the collaboration system 102 to share the calling party's computing device 116 with each of the called party's computing devices 118 (or otherwise initiate a peer-to-peer screen share session).

Figure 13:
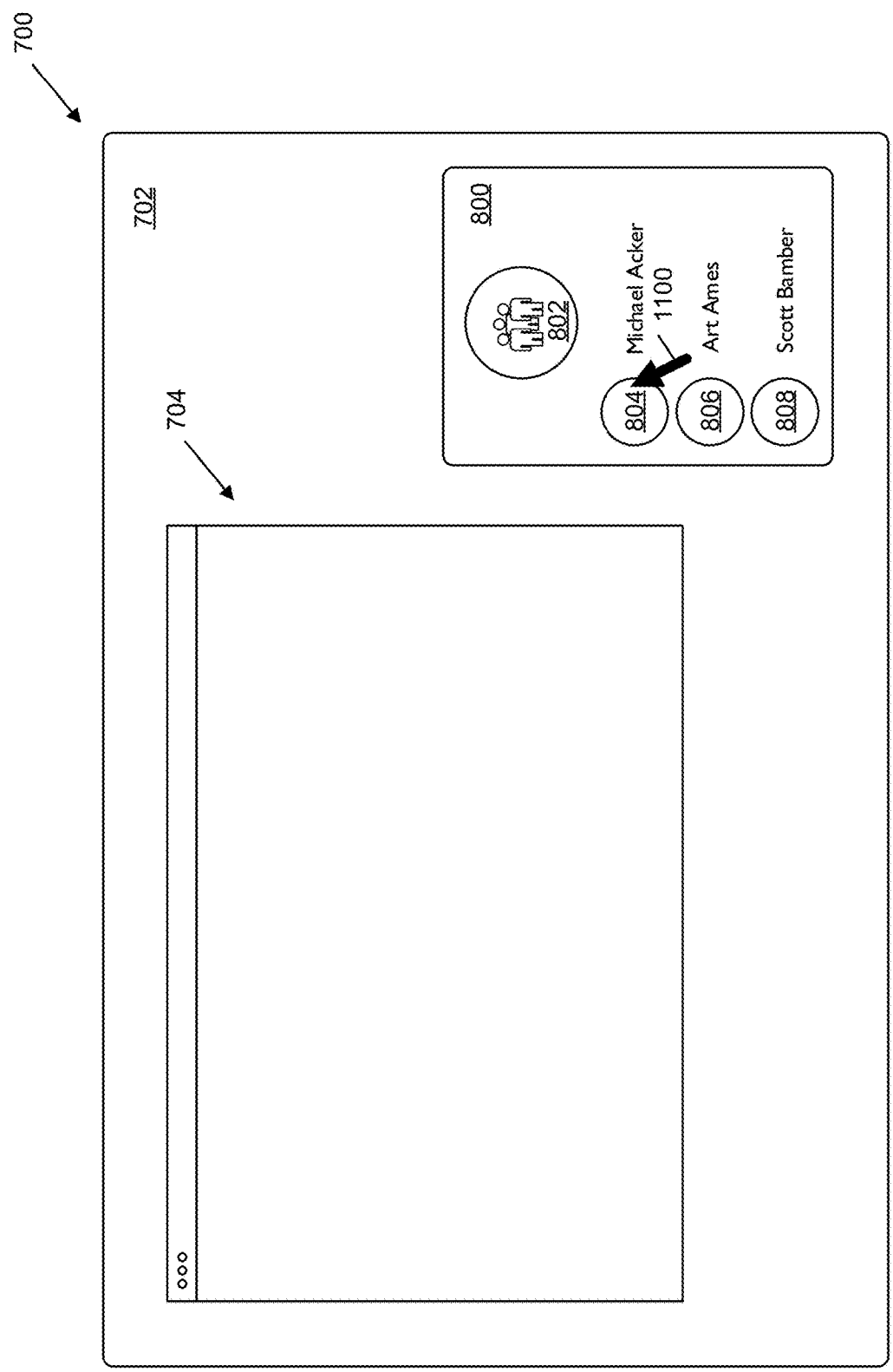
FIG. 13 illustrates the calling party selecting a called party user interface object.
Figure 14:
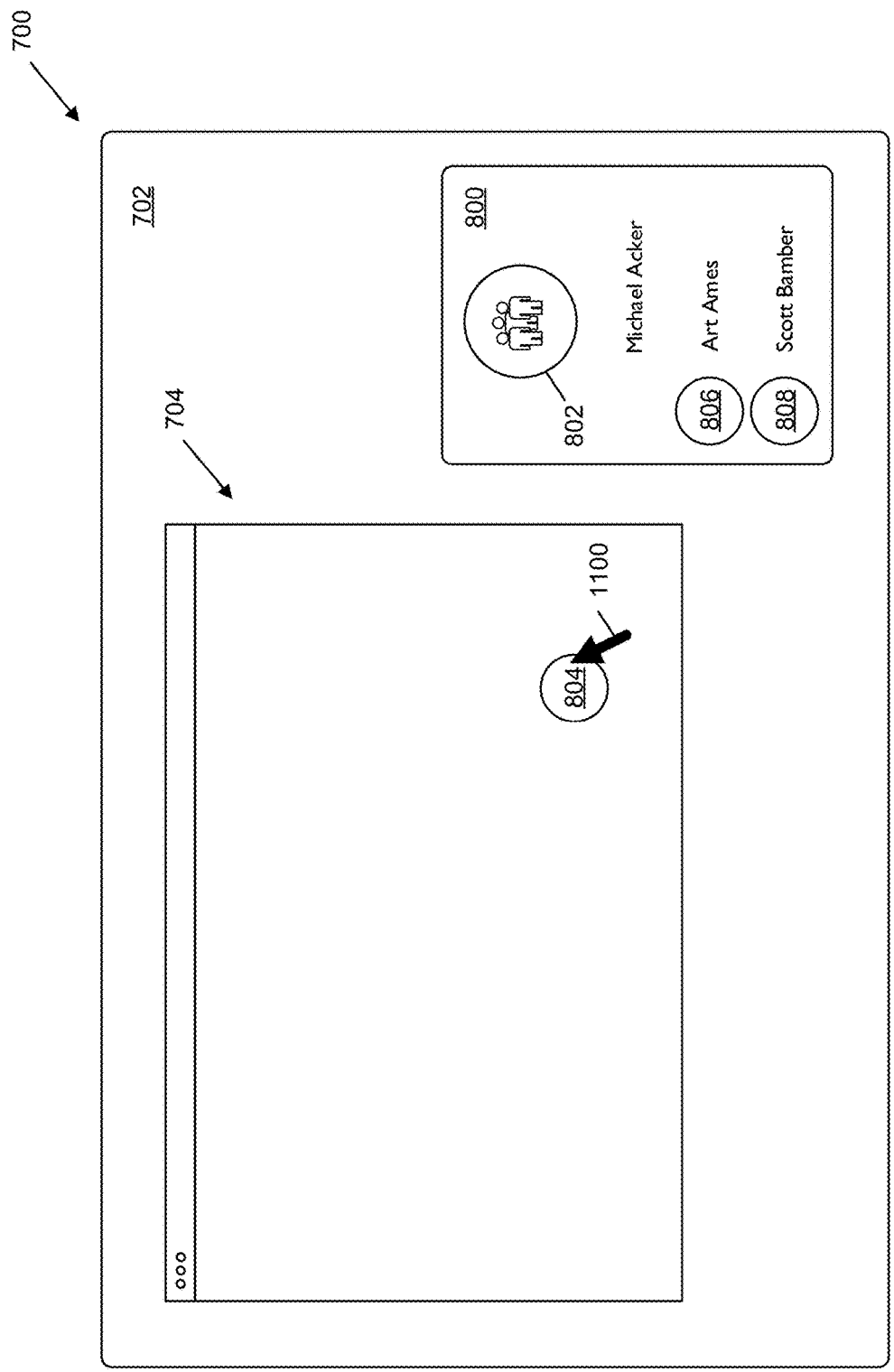
FIG. 14 illustrates the called party user interface object being dragged and dropped to an application window region to initiate a screen share session for the corresponding application.

FIGS. 13 and 14 illustrate an embodiment in which the calling party 104 initiates a window screen share session 120 with an individual participant. As illustrated in FIG. 13, the calling party 104 selects the object 804 corresponding to the participant named "Michael Acker" via the cursor 1100 (or other input means), and then drags and drops the object 804 within the application window 704 (FIG. 14). In response to a drag-and-drop operation of an individual object 804 to an application window 704, the computing device 116 may send a command to the collaboration system 102 to share the application window 702 with Michael Acker (or otherwise initiate a peer-to-peer screen share session).

It should be appreciated that the screen share session 120 may be configured to enable the sharing parties to collaborate in various desirable ways. For example, during a screen share session, the parties may perform a group edit of displayed document(s), share application-specific features, and/or collaborate in various ways (e.g., group and/or individual messaging).

Figure 15:
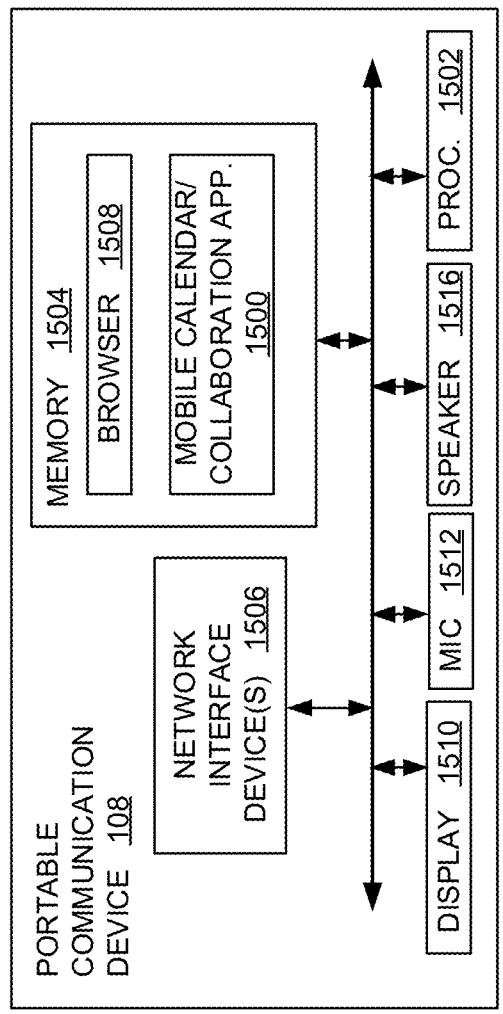
FIG. 15 is a block diagram illustrating an embodiment of a mobile communication device for initiating a remote voice call and generating a message to the collaboration system.

FIG. 15 illustrates an embodiment of a calling party's mobile communication device 108. The mobile communication device 108 comprises a processor 1502, a memory 1504, a network interface device 1506, a display 1510, a microphone 1512, and a speaker 1516 interconnected via a local interface. The memory 1504 comprises software executed by the processor 1502. It should be appreciated that the software may be configured to implement aspects of the methods described above for establishing the screen share session 120 for a remote voice call 112. In an embodiment, the software may comprise a browser 1508, the dialer application 111, or a mobile calendar/collaboration application 1500 as described above. The network interface device(s) 1506 facilitate communication with the collaboration system 102 or other computing or communication devices via the communication networks 114. The microphone 1512 and speaker 1516 may be used for the remote voice call 112. The display 1510 may comprise a touchscreen display device or other display device.

Figure 16:
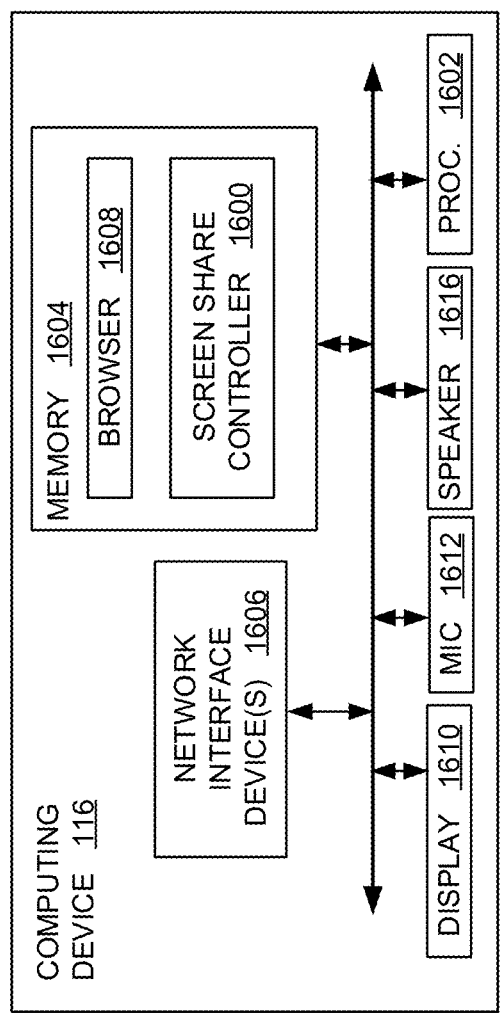
FIG. 16 is a block diagram illustrating an embodiment of a computing device for displaying the screen share control and establishing a screen share session during a remote voice call.

FIG. 16 illustrates an embodiment of a computing device 116 or 118 for displaying the screen share user interface control 706 and establishing the screen share session 120 as described above. The computing device 116 comprises a processor 1602, a memory 1604, a network interface device 1606, a display 1610, a microphone 1612, and a speaker 1616 interconnected via a local interface. The memory 1604 comprises software executed by the processor 1202. It should be appreciated that the software may be configured to implement aspects of the methods described above for establishing the screen share session 120 for a remote voice call 112. In an embodiment, the software may comprise a browser 1608 and a screen share controller 1600 for displaying the screen share user interface control 706 as instructed by the collaboration system 102. The network interface device(s) 1606 facilitate communication with the collaboration system 102, other computing devices, and/or servers via the communication networks 114. The microphone 1512 and speaker 1516 may be used for providing audio input and output. The display 1610 may comprise an external or integrated display device, such as a touchscreen display device or other display device.

FIG. 17 illustrates an embodiment of a method 1700 that may be implemented in the computer system 100 of FIG. 1 for establishing the screen share session 120 during the remote voice call 112. At block 1702, a mobile communication device 108 may initiate a voice call between a calling party 104 and one or more called parties 106. At block 1704, an application executing on a processing device (e.g., dialer application 111, mobile calendar/collaboration application 1500, or mobile application(s) or software) may generate a message identifying the calling party 104 and the one or more called parties 106 on the voice call. At block 1706, a server associated with the collaboration system 102 may receive the message generated by the application executing on the calling party's mobile communication device 108. The message may comprise information identifying the calling party 104 and/or the one or more called parties 106. At block 1706, in response to the message, the collaboration server may determine that the voice call is a remote voice call 112. At block 1710, the collaboration server may determine that the calling party 104 and one or more of the called parties 106 identified in the message have an active collaboration presence with the collaboration system 102. At block 1712, the collaboration system 102 may initiate the display of the screen share user interface control 1706 on the computing devices associated with participants on the remote voice call 112 who have registered an active collaboration presence. As described above, the screen share user interface control 706 enables the calling party 104 and the one or more called parties 106 to conveniently establish the screen share session 120 during the remote voice call 112.

It should be appreciated that one or more of the process or method descriptions associated with the flow charts or block diagrams above may represent modules, segments, logic or portions of code that include one or more executable instructions for implementing logical functions or steps in the process. It should be further appreciated that the logical functions may be implemented in software, hardware, firmware, or any combination thereof. In certain embodiments, the logical functions may be implemented in software or firmware that is stored in memory or non-volatile memory and that is executed by hardware (e.g., microcontroller) or any other processor(s) or suitable instruction execution system associated with the computer system 100. Furthermore, the logical functions may be embodied in any computer readable medium for use by or in connection with an instruction execution system, apparatus, or device, such as a computer-based system, processor-containing system, or other system associated with the computer system 100 that can fetch the instructions from the instruction execution system, apparatus, or device and execute the instructions.

It should be noted that this disclosure has been presented with reference to one or more exemplary or described embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for establishing a screen share session, the method comprising:
   a mobile communication device initiating an outgoing voice-only call, via a communication service which is configured to provide the voice-only call without an accompanying online collaboration, between a calling party operating the mobile communication device and one or more called parties;
   in response to initiating the voice-only call, the mobile communication device generating a message specifying the calling party and the one or more called parties;
   transmitting the message to a collaboration server associated with a collaboration-only service provided by a service provider not affiliated with the communication service providing the voice-only call;
   the collaboration server receiving the message;
   the collaboration server determining that the calling party and the one or more called parties identified in the message received from the mobile communication device have an active collaboration presence with the collaboration server; and
   the collaboration service initiating, during the voice-only call, a display of a screen share user interface control on a first computing device associated with the calling party and one or more second computing devices associated with the one or more called parties, the screen share user interface control configured to enable the calling party and the one or more called parties to establish a screen share session.

2. The method of claim 1, wherein the outgoing voice-only call is initiated via an application executing on the mobile communication device, the application comprising one of a native dialer application and a mobile application associated with the collaboration server.

3. The method of claim 1, wherein the screen share user interface control displayed on the first computing device associated with the calling party comprises a draggable user interface object identifying each of the one or more called parties.

4. The method of claim 3, wherein the calling party establishes the screen share session with a first called party by dragging and dropping the corresponding draggable user interface object to a display region of the first computing device.

5. The method of claim 4, wherein the display region comprises one of a window and a desktop.

6. The method of claim 3, wherein the screen share user interface control displayed on the first computing device associated with the calling party further comprises a draggable group user interface object for establishing the screen share session with each of the called parties.

7. The method of claim 1, wherein the determining the active collaboration presence comprises accessing a user profile database.

8. The method of claim 1, wherein the message identifies one or more of the called party and the one or more called parties with a telephone number, a participant name, or a user identifier.

9. A computer program embodied in a non-transitory computer-readable medium and executed by a processing device associated with a collaboration server for establishing a screen share session between two or more participants in a remote voice call, the computer program comprising logic configured to:
   receive a message from an application executing on a mobile communication device, the message identifying that a voice call remote to the collaboration server has been initiated by the mobile communication device and established between a calling party using the mobile communication device and one or more called parties, the remote voice call provided by a communication service provider not affiliated with a collaboration service provided by the collaboration server;
   determine that the calling party and the one or more called parties in the remote voice call have an active collaboration presence with the collaboration server; and
   initiate during the remote voice call provided by the unaffiliated communication service provider a display of a screen share user interface control on a first computing device associated with the calling party and one or more second computing devices associated with the one or more called parties, the screen share user interface control configured to enable the calling party and the one or more called parties to establish a screen share session.

10. The computer program of claim 9, wherein the application executing on the mobile communication device comprises one of a native dialer application and a mobile application associated with the collaboration server.

11. The computer program of claim 9, wherein the screen share user interface control displayed on the first computing device associated with the calling party comprises a draggable user interface object identifying each of the one or more called parties.

12. The computer program of claim 11, wherein the calling party establishes the screen share session with a first called party by dragging and dropping the corresponding draggable user interface object to a display region of the first computing device.

13. The computer program of claim 12, wherein the display region comprises one of a window and a desktop.

14. The computer program of claim 11, wherein the screen share user interface control displayed on the first computing device associated with the calling party further comprises a draggable group user interface object for establishing the screen share session with each of the called parties.

15. The computer program of claim 9, wherein the determining the active collaboration presence comprises accessing a user profile database.

16. The computer program of claim 9, wherein the message identifies the called party and the one or more called parties on the remote voice call with a telephone number, a participant name, or a user identifier.

17. A computer system for establishing a screen share session between participants in a remote voice call, the computer system comprising:
  a mobile communication device configured to initiate an outgoing voice-only call, via a communication service configured to provide the voice-only call without an accompanying online collaboration, between a calling party and one or more called parties, the mobile communication device comprising a mobile application executable by a processing device and comprising logic configured to generate a message identifying the calling party and the one or more called parties on the voice-only call;
  a collaboration server in communication with the mobile application via a communication network and associated with a collaboration-only service provided by a service provider not affiliated with the communication service providing the voice-only call, the collaboration server comprising:
    an external voice call detection component configured to receive the message from the mobile application and determine that the voice-only call is a remote voice call;
    a collaboration presence component configured to determine that the calling party and the one or more called parties identified in the message as participating in the remote voice-only call have an active collaboration presence with the collaboration server; and
    a screen share component in communication with the collaboration presence component, the screen share component configured to initiate a display of a screen share user interface control on a first computing device associated with the calling party and one or more second computing devices associated with the one or more called parties, the screen share user interface control configured to enable the calling party and the one or more called parties to establish a screen share session.

18. The computer system of claim 17, wherein the screen share user interface control displayed on the first computing device associated with the calling party comprises a draggable user interface object identifying each of the one or more called parties.

19. The computer system of claim 18, wherein the calling party establishes the screen share session with a first called party by dragging and dropping the corresponding draggable user interface object to a display region of the first computing device.

20. The computer system of claim 18, wherein the screen share user interface control displayed on the first computing device associated with the calling party further comprises a draggable group user interface object for establishing the screen share session with each of the called parties.

* * * * *